(12) United States Patent
Isomichi et al.

(10) Patent No.: US 12,482,854 B2
(45) Date of Patent: Nov. 25, 2025

(54) SOLID ELECTROLYTE LAYER, ALL-SOLID-STATE SECONDARY BATTERY, AND MANUFACTURING METHOD OF SAME

(71) Applicant: TDK CORPORATION, Tokyo (JP)

(72) Inventors: Gakuho Isomichi, Tokyo (JP); Haruna Kato, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 579 days.

(21) Appl. No.: 17/641,531

(22) PCT Filed: Aug. 31, 2020

(86) PCT No.: PCT/JP2020/032895
§ 371 (c)(1),
(2) Date: Mar. 9, 2022

(87) PCT Pub. No.: WO2021/049360
PCT Pub. Date: Mar. 18, 2021

(65) Prior Publication Data
US 2022/0294010 A1    Sep. 15, 2022

(30) Foreign Application Priority Data

Sep. 13, 2019  (JP) ................. 2019-167196

(51) Int. Cl.
*H01M 10/0562* (2010.01)
*C04B 35/447* (2006.01)
*C04B 35/64* (2006.01)

(52) U.S. Cl.
CPC ....... *H01M 10/0562* (2013.01); *C04B 35/447* (2013.01); *C04B 35/64* (2013.01);
(Continued)

(58) Field of Classification Search
CPC ................. H01M 10/0562; C04B 35/447
See application file for complete search history.

(56) References Cited

U.S. PATENT DOCUMENTS 5,961,950 A    10/1999  Dahn et al.
10,601,073 B2 *  3/2020  Yoshioka .......... H01M 10/0562
(Continued)

FOREIGN PATENT DOCUMENTS

EP    3 496 202 A1    6/2019
JP    H06-80462 A    3/1994
(Continued)

OTHER PUBLICATIONS

Davaasuren et al Impact of sintering temperature on phase formation, microstructure, crystallinity and ionic conductivity of Li1.5Al0.5Ti1.5(PO4)3, Solid State Ionics, vol. 338, 144-152 (2019) (Year: 2019).*
(Continued)

*Primary Examiner* — Amanda C. Walke
(74) *Attorney, Agent, or Firm* — Oliff PLC

(57) ABSTRACT

A solid electrolyte layer includes a solid electrolyte and a compound represented by a composition formula $M_xZr_2(PO_4)_y$. In the composition formula, M represents at least one selected from the group consisting of Na, K, Mg, Ca, Sr, Ba, Cu, Zn, and Ni, x satisfies $0<x\leq2.5$, and y satisfies $2.7\leq y\leq3.5$.

10 Claims, 1 Drawing Sheet

(52) U.S. Cl.
CPC .. *C04B 2235/447* (2013.01); *C04B 2235/656* (2013.01); *H01M 2300/0068* (2013.01); *H01M 2300/0091* (2013.01)

(56) References Cited

U.S. PATENT DOCUMENTS

| | | |
|---|---|---|
| 2012/0308900 A1 | 12/2012 | Ogasa |
| 2015/0333366 A1 | 11/2015 | Sato et al. |
| 2015/0364787 A1* | 12/2015 | Zhang ..................... C03C 3/14 429/321 |
| 2016/0268630 A1 | 9/2016 | Tsukada et al. |
| 2019/0252720 A1 | 8/2019 | Sato et al. |
| 2020/0020976 A1 | 1/2020 | Isomichi et al. |
| 2020/0083563 A1* | 3/2020 | Kawamura ....... H01M 10/0562 |
| 2020/0136217 A1 | 4/2020 | Kwon et al. |
| 2020/0266445 A1 | 8/2020 | Tsukada |
| 2021/0194046 A1 | 6/2021 | Nam et al. |
| 2022/0294010 A1 | 9/2022 | Isomichi et al. |
| 2023/0025424 A1 | 1/2023 | Tanaka |
| 2024/0120524 A1 | 4/2024 | Ueno et al. |
| 2024/0162480 A1 | 5/2024 | Kato et al. |
| 2024/0313259 A1 | 9/2024 | Masuko et al. |
| 2024/0413385 A1 | 12/2024 | Ueno et al. |
| 2025/0038174 A1 | 1/2025 | Suzuki et al. |
| 2025/0167296 A1 | 5/2025 | Sato et al. |
| 2025/0183360 A1 | 6/2025 | Kurihara et al. |

FOREIGN PATENT DOCUMENTS

| | | | |
|---|---|---|---|
| JP | H06349494 A | 12/1994 | |
| JP | 2001-143754 A | 5/2001 | |
| JP | 2006-244734 A | 9/2006 | |
| JP | 2012-246196 A | 12/2012 | |
| JP | 2015-065021 A | 4/2015 | |
| JP | 2016-001595 A | 1/2016 | |
| JP | 2019-067511 A | 4/2019 | |
| JP | 2021150055 A * | 9/2021 | |
| WO | WO-2012043566 A1 * | 4/2012 | ........... C04B 35/447 |
| WO | 2013/100000 A1 | 7/2013 | |
| WO | WO2017154922 A1 * | 9/2017 | |
| WO | 2018/025582 A1 | 2/2018 | |
| WO | 2018/181578 A1 | 10/2018 | |
| WO | 2019098613 A1 | 5/2019 | |

OTHER PUBLICATIONS

Bykov et al, Multivalent ionic conductivity in the series of phosphates LaxYb1/3-xZr2(PO4)3 with NASICON structure, Solid State Ionics, vol. 182, 47-52 (2011) (Year: 2011).*
Translation of Jun. 12, 2023 Office Action issued in CN Patent Application No. 202080063557.3.
Nov. 10, 2020 International Search Report issued in International Patent Application No. PCT/JP2020/032895.
English Translation of the Apr. 1, 2024 Office Action issued in Chinese Patent Application No. 202080063557.3.
Translation of Nov. 8, 2023 Office Action issued in CN Patent Application No. 202080063557.3.
Sep. 7, 2021 International Search Report issued in International Patent Application No. PCT/JP2021/023957.
Jun. 25, 2025 Non-Final Rejection received in U.S. Appl. No. 18/011,684.
Suzuki et al.; U.S. Appl. No. 18/011,684; filed Dec. 20, 2022.

* cited by examiner

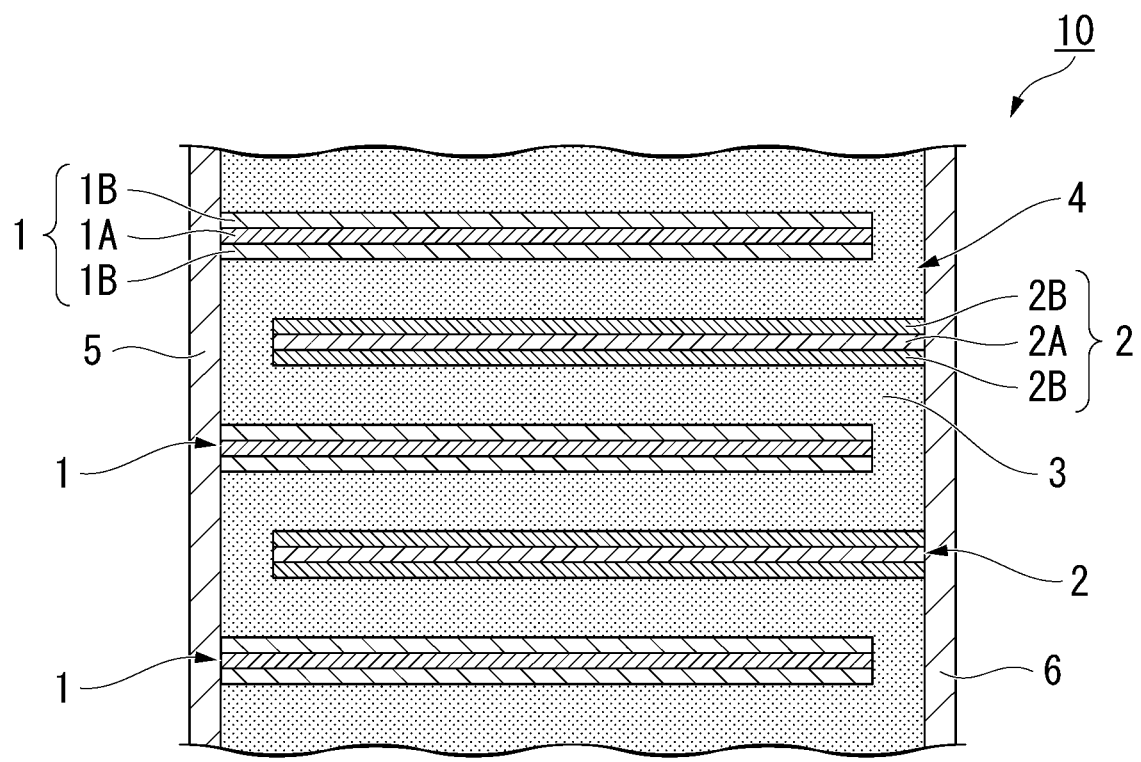

SOLID ELECTROLYTE LAYER, ALL-SOLID-STATE SECONDARY BATTERY, AND MANUFACTURING METHOD OF SAME

TECHNICAL FIELD

The present invention relates to a solid electrolyte layer, an all-solid-state secondary battery, and a manufacturing method thereof.

Priority is claimed on Japanese Patent Application No. 2019-167196, filed on Sep. 13, 2019, the content of which is incorporated herein by reference.

BACKGROUND ART

In recent years, batteries have been used for various purposes. Batteries are also used, for example, in portable batteries and the like, and are required to be smaller, lighter, thinner, and more reliable. Batteries using an electrolytic solution have problems such as liquid leakage and liquid depletion. Therefore, all-solid-state secondary batteries using solid electrolytes has attracted attention.

An all-solid-state secondary battery has a problem in that the output is smaller than the output of a battery using an electrolytic solution. Thus, it is required to enhance the ionic conductivity of the solid electrolyte forming the all-solid-state secondary battery.

For example, Patent Document 1 discloses an all-solid-state secondary battery using an oxide-based $Li_{1.3}Al_{0.3}Ti_{1.7}(PO_4)_3$ as a solid electrolyte. Patent Document 2 discloses an all-solid-state secondary battery using $LiZr_2(PO_4)_3$ containing Zr having excellent reduction resistance, as a solid electrolyte. Patent Document 3 discloses an all-solid-state secondary battery having excellent reduction resistance and using $Li_{1.55}Al_{0.2}Zr_{1.7}Y0.1Si_{0.25}P_{2.75}O_{12}$ of rhombohedral crystal.

CITATION LIST

Patent Documents

[Patent Document 1]
Japanese Unexamined Patent Application, First Publication No. 2016-1595
[Patent Document 2]
Japanese Unexamined Patent Application, First Publication No. 2001-143754
[Patent Document 3]
Japanese Unexamined Patent Application, First Publication No. 2012-246196

SUMMARY OF INVENTION

Technical Problem

Various solid electrolytes are used in an all-solid-state secondary battery. However, further improvement of the ionic conductivity is required, and a solid electrolyte layer having more excellent ionic conductivity is required.

The present invention has been made in view of the above circumstances, and an object thereof is to provide a solid electrolyte layer and an all-solid-state secondary battery capable of improving ionic conductivity. Another object of the present invention is to provide a manufacturing method of a solid electrolyte layer having excellent ionic conductivity and a manufacturing method of an all-solid-state secondary battery.

Solution to Problem

The inventors have found that the addition of a predetermined compound to a solid electrolyte layer containing a solid electrolyte causes improvement of ionic conductivity. That is, in order to solve the above problems, the following means are provided.

(1) According to a first aspect, a solid electrolyte layer includes a solid electrolyte and a compound represented by a composition formula $M_xZr_2(PO_4)_y$. In the composition formula, M represents at least one selected from the group consisting of Na, K, Mg, Ca, Sr, Ba, Cu, Zn, and Ni, x satisfies $0<x\leq2.5$, and y satisfies $2.7\leq y\leq3.5$.

(2) In the solid electrolyte layer according to the above aspect, an abundance ratio of the compound may be equal to or greater than 0.1 volume % and less than 100 volume %.

(3) In the solid electrolyte layer according to the above aspect, an average particle size of the compound may be 0.01 μm or more and 5 μm or less.

(4) In the solid electrolyte layer according to the above aspect, a ratio of a portion having a rhombohedral crystal structure and forming the solid electrolyte may be 50 volume % or more.

(5) In the solid electrolyte layer according to the above aspect, the solid electrolyte and the compound may have the same crystal structure.

(6) In the solid electrolyte layer according to the above aspect, the crystal structure of the compound may include rhombohedral crystal.

(7) In the solid electrolyte layer according to the above aspect, in a powder X-ray diffraction pattern obtained by X-ray diffraction measurement using a CuKα ray, peak intensity P1 of a peak in a range of $19°\leq2\theta\leq22°$ and peak intensity P2 of a peak in a range of $23°\leq2\theta\leq26°$ may satisfy a relationship of $0.5\leq P2/P1\leq3.0$.

(8) According to a second aspect, an all-solid-state secondary battery includes the solid electrolyte layer according to the above aspect, and a first electrode and a second electrode which sandwich the solid electrolyte layer.

(9) According to a third aspect, a manufacturing method of a solid electrolyte layer includes a step of mixing a solid electrolyte and a compound represented by a composition formula $M_xZr_2(PO_4)_y$, and a step of sintering a mixture obtained by the mixing, in a temperature range of 500° C. or higher and 1000° C. or lower. In the composition formula, M represents at least one selected from the group consisting of Na, K, Mg, Ca, Sr, Ba, Cu, Zn, and Ni, x satisfies $0<x\leq2.5$, and y satisfies $2.7\leq y\leq3.5$.

(10) According to a fourth aspect, a manufacturing method of an all-solid-state secondary battery is a manufacturing method of an all-solid-state battery including a solid electrolyte layer manufactured by the manufacturing method of a solid electrolyte layer according to the above aspect. The manufacturing method includes a step of forming a first electrode at a position facing one surface of the solid electrolyte layer, and a step of forming a second electrode at a position facing the other surface of the solid electrolyte layer.

Advantageous Effects of Invention

According to the solid electrolyte layer and the all-solid-state secondary battery according to the above aspects, it is possible to enhance ionic conductivity. Further, according to the manufacturing method of a solid electrolyte layer and the manufacturing method of an all-solid-state secondary battery according to the above aspects, it is possible to obtain a solid electrolyte layer and an all-solid-state secondary battery having excellent ionic conductivity.

BRIEF DESCRIPTION OF DRAWING

FIG. 1 is a schematic cross-sectional view representing an all-solid-state secondary battery according to an embodiment.

DESCRIPTION OF EMBODIMENTS

Hereinafter, the present invention will be described in detail with reference to the drawing as appropriate. The drawing used in the following description may be enlarged for convenience in order to make the features of the present invention easy to understand, and the dimensional ratios and the like of each component may differ from the actual ones. The materials, the dimensions, and the like exemplified in the following description are examples, and the present invention is not limited thereto. The present invention can be appropriately changed and carried out within a range without changing the gist of the present invention.

[All-Solid-State Secondary Battery]

FIG. 1 is a schematic cross-sectional view in which a main portion of an all-solid-state secondary battery according to a first embodiment is enlarged. As represented in FIG. 1, an all-solid-state secondary battery 10 includes a laminated body 4 including a positive electrode layer 1, a negative electrode layer 2, and a solid electrolyte layer 3. The positive electrode layer 1 is an example of a first electrode layer (first electrode), and the negative electrode layer 2 is an example of a second electrode layer (second electrode). One of the first electrode layer and the second electrode layer functions as the positive electrode, and the other functions as the negative electrode. The positive and negative of the electrode layer change depending on which polarity is connected to an external terminal.

Each positive electrode layer 1 is connected to a first external terminal 5, and each negative electrode layer 2 is connected to a second external terminal 6. The first external terminal 5 and the second external terminal 6 are electrical contact points with the outside.

(Laminated Body)

The laminated body 4 includes the positive electrode layer 1, the negative electrode layer 2, and the solid electrolyte layer 3. In the laminated body 4, the positive electrode layer 1 and the negative electrode layer 2 are alternately laminated via the solid electrolyte layer 3. That is, the positive electrode layer 1 is formed at a position facing one surface (main surface) of the solid electrolyte layer 3, and the negative electrode layer 2 is formed at a position facing the other surface (main surface) opposite the one surface. The all-solid-state secondary battery 10 is charged and discharged by exchanging lithium ions between the positive electrode layer 1 and the negative electrode layer 2 via the solid electrolyte layer 3.

"Solid Electrolyte Layer"

The solid electrolyte layer 3 contains a solid electrolyte and a predetermined compound (referred to as MZP below). The solid electrolyte and MZP are mixed in, for example, the solid electrolyte layer 3.

The solid electrolyte is a substance (for example, particles) capable of moving ions by an electric field applied from the outside. For example, lithium ions move in the solid electrolyte by an electric field applied from the outside.

The solid electrolyte contains, for example, lithium. The solid electrolyte may be, for example, either an oxide-based material or a sulfide-based material. The solid electrolyte may be, for example, any of a perovskite type compound, a LISICON type compound, a garnet type compound, a NASICON type compound, a thio-LISICON type compound, a glass compound, and a phosphoric acid compound. $La_{0.5}Li_{0.5}TiO_3$ is an example of the perovskite type compound. $Li_{14}Zn(GeO_4)_4$ is an example of the LISICON type compound. $Li_7La_3Zr_2O_{12}$ is an example of the garnet type compound. $LiZr_2(PO_4)_3$, $Li_{1.3}Al_{0.3}Ti_{1.7}(PO_4)_3$, $Li_{1.5}Al_{0.5}Ge_{1.5}(PO_4)_3$, $Li_{1.55}Al_{0.2}Zr_{1.7}Si_{0.25}P_{9.75}O_{12}$, $Li_{1.4}Na_{0.1}Zr_{1.5}Al_{0.5}(PO_4)_3$, $Li_{1.4}Ca_{0.25}Er_{0.3}Zr_{1.7}(PO_4)_{3.2}$, and $Li_{1.4}Ca_{0.25}Yb_{0.3}Zr_{1.7}(PO_4)_{3.2}$ are examples of the NASICON type compound. $Li_{3.25}Ge_{0.25}P_{0.75}S_4$ and $Li_3PS_4$ are examples of the thio-LISICON type compounds. $Li_2S-P_2S_5$ and $Li_2O-V_2O_5-SiO_2$ are examples of the glass compound. $Li_3PO_4$, $Li_{3.5}Si_{0.5}P_{0.5}O_4$ and $Li_{2.9}PO_{3.3}N_{0.46}$ are examples of the phosphoric acid compound. The solid electrolyte may contain one or more of the above compounds.

The solid electrolyte is, for example, a NASICON type compound and has, for example, a rhombohedral crystal structure. In the solid electrolyte, the ratio of a portion having a rhombohedral crystal structure is preferably equal to or greater than 50 volume % and equal to or less than 98 volume %, and more preferably equal to or greater than 50 volume % and equal to or less than 95 volume %.

The shape of the solid electrolyte is not particularly limited. The shape of the solid electrolyte is, for example, spherical, ellipsoidal, needle-like, plate-like, scaly, tubular, wire-like, rod-like, or amorphous. The particle size of the solid electrolyte is, for example, equal to or greater than 0.1 µm and equal to or less than 10 µm, and may be equal to or greater than 0.3 µm and equal to or less than 9 µm. The particle size of particles is obtained from a measured value (D50) obtained by measuring the particle size distribution. D50 indicates the diameter of particles of which the integrated value in a distribution curve obtained by the particle size distribution measurement is 50%. The particle size distribution of particles is measured by, for example, a particle size distribution-measuring device using a laser diffraction/scattering method (microtrack method).

MZP refers to a compound represented by the composition formula $MxZr_2(PO_4)$. M represents at least one selected from the group consisting of Na, K, Mg, Ca, Sr, Ba, Cu, Zn, and Ni. x satisfies $0<x≤2.5$, and y satisfies $2.7≤y≤3.5$.

MZP preferably includes, for example, the same crystal structure as the solid electrolyte. The crystal structure of MZP preferably contains, for example, rhombohedral crystal. If the crystal structures of MZP and the solid electrolyte are the same as each other, a path for conducting ions is less likely to be disturbed, and the ionic conductivity is enhanced. The rhombohedral crystal enables the path for conducting the ions to be secured three-dimensionally.

MZP exists, for example, in the form of particles in the solid electrolyte layer 3. The shape of MZP is not particularly limited. The shape of MZP is, for example, spherical, ellipsoidal, needle-like, plate-like, scaly, tubular, wire-like, rod-like, or amorphous. The particle size of MZP is, for example, equal to or greater than 0.01 µm and equal to or less than 5 µm, preferably equal to or greater than 0.3 µm and equal to or less than 3 µm.

The abundance ratio of MZP to the solid electrolyte is, for example, equal to or greater than 0.1 volume % and less than 100 volume %, preferably equal to or greater than 30 volume % and equal to or less than 96 volume %, and more preferably equal to or greater than 40 volume % and equal to or less than 70 volume %.

The abundance ratio between MZP and the solid electrolyte in the solid electrolyte layer 3 is detected by using, for example, Laser Ablation Inductively Coupled Plasma Mass Spectrometry (LA-ICP-MS). First, element mapping of a cross section obtained by cutting the solid electrolyte layer 3 is performed by using LA-ICP. Element mapping is performed, for example, for each of Li, M (M represents at least one selected from the group consisting of Na, K, Mg, Ca, Sr, Ba, Cu, Zn, and Ni), Zr, P, and O. The composition of each particle recognized on the cut surface is calculated from the mapping result, and it is determined whether each particle corresponds to the solid electrolyte or MZP. Then, the ratio between the area of the solid electrolyte and the area of MZP on the cut surface is obtained. A similar operation is performed on 20 images of cut surfaces, and the average value of the ratio between the solid electrolyte and MZP is obtained. The average value is used as the abundance ratio between MZP and the solid electrolyte.

Considering that the brightness obtained differs depending on the composition of the particles, for example, if image processing is performed on an image obtained by using a scanning electron microscope (SEM) or a transmission electron microscope (TEM), the area ratio between the solid electrolyte and MZP can be calculated. The abundance ratio between the MZP and the solid electrolyte can be obtained from the comparison between the calculated area ratios of the solid electrolyte and MZP.

When X-ray diffraction measurement is performed on the solid electrolyte layer 3 by using a CuKα ray, a diffraction peak is recognized. In a powder X-ray diffraction pattern obtained by X-ray diffraction measurement using a CuKα ray, a peak shown in a range of $19°≤2θ≤22°$ is referred to as a first peak, a peak shown in a range of $23°≤2θ≤26°$ is referred to as a second peak, and a peak shown in a range of $30°≤2θ≤36°$ is referred to as a third peak.

The peak intensity P1 of the first peak and the peak intensity P2 of the second peak satisfy, for example, a relationship of $0.5≤P2/P1≤3.0$, and preferably a relationship of $0.8≤P2/P1≤2.0$. The peak intensity P1 of the first peak and the peak intensity P3 of the third peak satisfy, for example, a relationship of $0.5≤P3/P1≤3.0$.

The solid electrolyte layer 3 may contain a material other than the solid electrolyte and MZP. The solid electrolyte layer 3 may contain, for example, a sintering aid or the like.

The sintering aid is not particularly limited as long as the sintering aid enables lowering of the temperature of sintering. Although not limited to the above examples, for example, a lithium compound such as lithium carbonate, lithium hydroxide, or lithium phosphate, a boron compound such as $H_3BO_3$, or a compound composed of lithium and boron is preferably used as the sintering aid.

"Positive Electrode Layer and Negative Electrode Layer"

The positive electrode layer 1 includes a positive electrode current collector layer 1A and a positive electrode active material layer 1B containing a positive electrode active material. The negative electrode layer 2 has a negative electrode current collector layer 2A and a negative electrode active material layer 2B containing a negative electrode active material.

The positive electrode current collector layer 1A and the negative electrode current collector layer 2A have excellent conductivity. The positive electrode current collector layer 1A and the negative electrode current collector layer 2A are, for example, silver, palladium, gold, platinum, aluminum, copper, or nickel. Copper is less likely to react with a positive electrode active material, a negative electrode active material, and a solid electrolyte. For example, if copper is used for the positive electrode current collector layer 1A and the negative electrode current collector layer 2A, it is possible to reduce the internal resistance of the all-solid-state secondary battery 10. The substances forming the positive electrode current collector layer 1A and the negative electrode current collector layer 2A may be the same or different.

The positive electrode active material layer 1B is formed on one surface or both surfaces of the positive electrode current collector layer 1A. The positive electrode active material layer 1B may not be provided on the surface of the positive electrode current collector layer 1A on the side where the facing negative electrode layer 2 is not provided.

The negative electrode active material layer 2B is formed on one side or both sides of the negative electrode current collector layer 2A. The negative electrode active material layer 2B may not be provided on the surface of the negative electrode current collector layer 2A on the side where the facing positive electrode layer 1 is not provided. For example, the positive electrode layer 1 or the negative electrode layer 2 located at the uppermost layer or the lowermost layer of the laminated body 4 may not include the positive electrode active material layer 1B or the negative electrode active material layer 2B on one side.

The positive electrode active material layer 1B and the negative electrode active material layer 2B contain a positive electrode active material and a negative electrode active material that exchange electrons. In addition, a conductive aid, an ion-inducing aid, a binder, and the like may be contained. As the positive electrode active material and the negative electrode active material, materials capable of efficiently injecting and desorbing lithium ions are preferable.

The positive electrode active material and the negative electrode active material are, for example, a transition metal oxide and a transition metal composite oxide. Specific examples of the positive electrode active material and the negative electrode active material include lithium manganese composite oxide $Li_2Mn_aMa_{1-a}O_3$ ($0.8≤a≤1$, Ma=Co, Ni), lithium cobalt oxide ($LiCoO_2$), lithium nickel oxide ($LiNiO_2$), lithium manganese spinel ($LiMn_2O_4$), a composite metal oxide represented by a general formula: $LiNi_xCo_yMn_zO_2$ ($x+y+z=1$, $0≤x≤1$, $0≤y≤1$, $0≤z≤1$), a lithium vanadium compound ($LiV_2O_5$), olivine type $LiMbPO_4$ (where, Mb indicates one or more types of elements selected from Co, Ni, Mn, Fe, Mg, Nb, Ti, Al, and Zr), vanadium lithium phosphate ($Li_3V_2(PO_4)_3$ or $LiVOPO_4$), a Li-excess solid solution positive electrode represented by $Li_2MnO_3$-$LiMcO_2$ (Mc=Mn, Co, Ni), lithium titanate ($Li_4Ti_5O_{12}$), a composite metal oxide represented by $Li_sNi_tCo_uAl_vO_2$ ($0.9<s<1.3$, $0.9<t+u+v<1.1$), and the like.

Examples of the conductive aid include carbon materials such as carbon black, acetylene black, ketjen black, carbon nanotubes, graphite, graphene, and activated carbon; metal materials such as gold, silver, palladium, platinum, copper, and tin; and conductive oxides such as indium tin oxides (ITO), titanium oxides, tin oxides, zinc oxides, and tungsten oxides.

The ion-inducing aid is, for example, a solid electrolyte. As the solid electrolyte, specifically, for example, a similar material to that used for the solid electrolyte layer 3 can be used.

When a solid electrolyte is used as the ion-inducing aid, the same material is preferably used for the ion inducing-aid and the solid electrolyte used for the solid electrolyte layer 3.

There is no clear distinction between the active material forming the positive electrode active material layer 1B or the negative electrode active material layer 2B. The potentials of two types of compounds are compared, and the compound showing a higher potential can be used as the positive electrode active material, and the compound showing a lower potential can be used as the negative electrode active material.

The positive electrode current collector layer 1A may contain a positive electrode active material, and the negative electrode current collector layer 2A may contain a negative electrode active material. The content ratio of the active material contained in each current collector is not particularly limited as long as the active material functions as a current collector. For example, it is preferable that a positive electrode current collector/positive electrode active material or a negative electrode current collector/negative electrode active material be in a range of 90/10 to 70/30 in volume ratio.

When the positive electrode current collector layer 1A contains the positive electrode active material, and the negative electrode current collector layer 2A contains the negative electrode active material, adhesion between the positive electrode current collector layer 1A and the positive electrode active material layer 1B, and between the negative electrode current collector layer 2A and the negative electrode active material layer 2B is improved.

(Terminal)

For the first external terminal 5 and the second external terminal 6, for example, a material having excellent conductivity is used. The first external terminal 5 and the second external terminal 6 are, for example, any one of silver, gold, platinum, aluminum, copper, tin, nickel, chromium, or titanium. The first external terminal 5 and the second external terminal 6 may be a single layer or a plurality of layers.

(Protective Layer)

In the all-solid-state secondary battery 10, a protective layer for electrically, physically, and chemically protecting the laminated body 4 and the terminals may be provided on the outer periphery. As the protective layer, for example, a material that has excellent insulating property, durability, and moisture resistance and is environmentally safe is preferable. The protective layer is, for example, glass, ceramics, thermosetting resin, or photocurable resin. As the material of the protective layer, only one type may be used, or a plurality of types may be used in combination. The protective layer may be a single layer or a plurality of layers. For the protective layer, an organic-inorganic hybrid in which thermosetting resin and ceramic powder are mixed is preferable.

Next, a manufacturing method of the all-solid-state secondary battery according to the present embodiment will be described. The all-solid-state secondary battery 10 may be produced by a simultaneous firing method or a sequential firing method. The simultaneous firing method is a method of stacking the materials forming the layers and then firing the materials all at once. The sequential firing method is a method of performing firing each time each layer is laminated. The simultaneous firing method has a simpler operation step than the sequential firing method. The laminated body 4 produced by the simultaneous firing method is denser than the laminated body 4 produced by the sequential firing method. A case using the simultaneous firing method will be described below as an example.

First, a paste for each layer forming the laminated body 4 is produced. Each of the materials used for the positive electrode current collector layer 1A, the positive electrode active material layer 1B, the solid electrolyte layer 3, the negative electrode active material layer 2B, and the negative electrode current collector layer 2A is pasted. The method of pasting is not particularly limited. For example, the powder of each material is mixed with a vehicle to obtain a paste. Vehicle is a general term for media in the liquid phase. The vehicle includes a solvent and a binder.

As the paste of the solid electrolyte layer 3, a mixture of a solid electrolyte and MZP is added to the vehicle. The solid electrolyte and MZP are mixed without pulverizing either.

Then, a green sheet is produced. The green sheet is obtained by processing a paste into a sheet. The green sheet is obtained, for example, by applying the paste onto a substrate such as PET (polyethylene terephthalate) in a desired order, drying the paste as necessary, and then peeling the paste from the substrate. A method of applying the paste is not particularly limited. For example, known methods such as screen printing, coating, transfer, doctor blade, and inkjet can be adopted.

The produced green sheets are laminated in a desired order and the desired number of layers. Alignment, cutting, and the like are performed as necessary to produce a laminated body. When a parallel type or series-parallel type battery is produced, the positive electrode current collector layer and the negative electrode current collector layer are aligned so that the end surfaces of the positive electrode current collector layer and the end surfaces of the negative electrode current collector layer do not match.

The laminated body may be produced after a positive electrode active material layer unit and a negative electrode active material layer unit described below are prepared.

First, a paste for a solid electrolyte layer is formed on a PET film in the form of a sheet by a doctor blade method, and then is dried. Then, a paste for the positive electrode active material layer is printed on the green sheet of the solid electrolyte layer by screen printing, and then is dried. Then, a paste for the positive electrode current collector layer is printed on the dried paste for the positive electrode active material layer by screen printing, and then is dried. Further, the paste for the positive electrode active material layer is printed again by screen printing on the dried paste for the positive electrode current collector layer, and then is dried. The positive electrode unit is produced by peeling off the PET film. In the positive electrode unit, the solid electrolyte layer 3, the positive electrode active material layer 1B, the positive electrode current collector layer 1A, and the positive electrode active material layer 1B are laminated in this order.

The negative electrode unit is produced by a similar procedure. In the negative electrode unit, the solid electrolyte layer 3, the negative electrode active material layer 2B, the negative electrode current collector layer 2A, and the negative electrode active material layer 2B are laminated in this order.

Then, the positive electrode unit and the negative electrode unit are laminated. The positive electrode unit and the negative electrode unit are laminated so that the solid electrolyte layers of the positive electrode unit and the negative electrode unit do not face each other. In the laminated body, the positive electrode active material layer 1B, the positive electrode current collector layer 1A, the positive electrode active material layer 1B, the solid electrolyte layer 3, the negative electrode active material layer 2B, the negative electrode current collector layer 2A, the negative electrode active material layer 2B, and the solid electrolyte layer 3 are laminated in this order. The positive electrode unit and the negative electrode unit are laminated in a staggered manner, so that the positive electrode current collector layer 1A is exposed to a first end surface of the laminated body, and the negative electrode current collector layer 2A is exposed to a second end surface opposite the first end surface. For example, a solid electrolyte layer sheet having a predetermined thickness is further laminated on the uppermost layer and the lowermost layer in a stacking direction, and then is dried.

Then, the produced laminated bodies are collectively crimped. Crimping is performed while heating. The heating temperature is, for example, 40° C. to 95° C. Then, the crimped laminated body is sintered. Sintering means heating in a temperature range of 500° C. or higher and 1000° C. or lower in a nitrogen atmosphere, for example. A firing time is set to, for example, 0.1 to 3 hours. The laminated body 4 is obtained by the sintering. At this time, the solid electrolyte layer 3 containing the solid electrolyte and MZP is obtained. By crimping here, a positive electrode (first electrode) is formed at a position facing one surface of the solid electrolyte layer 3, and a negative electrode (second electrode) is formed at a position facing the other surface of the solid electrolyte layer 3 (the surface opposite the one surface).

The sintered body may be put into a cylindrical container together with an abrasive such as alumina, and then be barrel-polished. The corners of the sintered body are chamfered by polishing. Polishing may be performed by sandblasting or the like.

Finally, the first external terminal 5 and the second external terminal 6 are attached to the laminated body 4. The first external terminal 5 and the second external terminal 6 are formed so as to be in electrical contact with the positive electrode current collector layer 1A or the negative electrode current collector layer 2A. For example, the first external terminal 5 is connected to the positive electrode current collector layer 1A exposed from the side surface of the laminated body 4, and the second external terminal 6 is connected to the negative electrode current collector layer 2A exposed from the side surface of the laminated body 4. The first external terminal 5 and the second external terminal 6 can be produced by, for example, a sputtering method, a dipping method, a spray coating method, or the like.

The solid electrolyte layer 3 according to the present embodiment has excellent ionic conductivity because the solid electrolyte layer 3 contains MZP. Although the reason is not clear, it is considered that the layers of MZP are widened by M ions, a path through which lithium ions easily pass is formed in the solid electrolyte layer 3, and the conductivity of lithium ions in the solid electrolyte layer 3 is improved.

The solid electrolyte and MZP preferably include the same crystal structure. A case where the crystal structures of the solid electrolyte particles and MZP are the same as each other will be described as an example. Lithium ions move through gaps between crystal lattices in the solid electrolyte layer 3. Lithium ions move between sites in the solid electrolyte layer 3, in which lithium ions can enter.

When the solid electrolyte layer 3 is entirely formed of a solid electrolyte, the path between the sites is formed by lithium ions that maintain the crystal structure. When the solid electrolyte layer 3 is entirely formed of the solid electrolyte, the width of such a path is substantially constant in the solid electrolyte layer 3. When MZP is added to the solid electrolyte layer 3, a portion of the path in the solid electrolyte layer 3 is widened. M ions (M represents at least one selected from the group consisting of Na, K, Mg, Ca, Sr, Ba, Cu, Zn, and Ni) have a larger ionic radius than lithium ions and widen gaps between crystal lattices in the crystal structure. That is, when the solid electrolyte layer 3 contains MZP, a wide path is formed in the solid electrolyte layer 3 from the standpoint of lithium ions. As a result, it is considered that the solid electrolyte layer 3 according to the present embodiment has improved ionic conductivity.

This principle is just an argument when the crystal structures of the solid electrolyte and MZP are the same as each other. As can be recognized in examples described later, when the crystal structures of the solid electrolyte and MZP are different from each other, a similar effect is recognized even when the solid electrolyte is amorphous (glass). Although this principle is not clear, portions of the solid electrolyte layer 3 through which lithium ions easily pass may be interspersed by MZP, and this may facilitate hopping conduction of lithium ions and improve the ionic conductivity of the solid electrolyte layer 3.

Further, in the all-solid-state secondary battery produced by using such a solid electrolyte layer, the voltage loss in the solid electrolyte layer is small, and the active material that contributes to the capacity of the battery can efficiently use energy. Therefore, it is possible to increase the capacity of the all-solid-state secondary battery.

Although the embodiment of the present invention has been described in detail with reference to the drawing, the components and combinations thereof in each embodiment are examples, and addition, omission, replacement, and other changes of the components may be made within a range without departing from the gist of the present invention.

EXAMPLES

Example 1

$LiZr_2(PO_4)_3$ was produced as a solid electrolyte by the following procedure. First, each of $LiOH·H_2O$, $ZrO(NO_3)_2·2H_2O$, and $NH_4(H_2PO_4)$ was weighed at the weighing ratios, and each was dissolved in water. Each solution was mixed. pH was adjusted, and then the mixture was heated to 100° C. Then, the mixture was slowly cooled. It was checked that the solid electrolyte in Example 1 had a rhombohedral crystal structure.

$Ca_{0.5}Zr_2(PO_4)_3$ was produced as MZP by the following procedure in a similar procedure. First, $Ca(NO_3)_2·4H_2O$, $ZrO(NO_3)_2·2H_2O$, and $NH_4(H_2PO_4)$ were weighed at the weighing ratios, and each was dissolved in water. Each solution was mixed. pH of the mixture was adjusted, and then the mixture was heated to 100° C. Then, the mixture was slowly cooled. It was checked that MZP in Example 1 had a rhombohedral crystal structure.

Then, the particle size distribution of the obtained solid electrolyte was measured. The particle size distribution was measured by using a particle size distribution-measuring device using a laser diffraction/scattering method (microtrack method).

Then, the produced $LiZr_2(PO_4)_3$ and $Ca_{0.5}Zr_2(PO_4)_3$ were mixed in equal amounts and sintered in a temperature range of 700° C. or higher and 1000° C. or lower.

Then, X-ray diffraction measurement was performed on the produced solid electrolyte layer, by using a CuKα ray. As a result, the ratio P2/P1 between the peak intensity P1 of the first peak and the peak intensity P2 of the second peak was 0.88. The ionic conductivity of the produced solid electrolyte layer was also measured. The ionic conductivity was measured by an impedance analyzer (manufactured by Solartron, model number SI1260) in which electrodes are connected to both sides of a solid electrolyte molded into a disk shape, under the conditions of an amplitude of 50 mV and a frequency of 0.5 Hz to 1 MHz. The ionic conductivity of the solid electrolyte in Example 1 was $8.10 \times 10^{-6}$ S/cm.

Comparative Example 1

Comparative Example 1 is different from Example 1 in that MZP was not added to the solid electrolyte layer. Other conditions were set to be similar to those in Example 1. The ionic conductivity of the solid electrolyte in Comparative Example 1 was $1.02 \times 10^{-7}$ S/cm.

Comparing Example 1 and Comparative Example 1, the ionic conductivity in Example 1 to which MZP was added was higher than the ionic conductivity in Comparative Example 1.

Examples 2 to 8

Examples 2 to 8 are different from Example 1 in that the material of the solid electrolyte forming the solid electrolyte layer was changed. Other conditions were set to be similar to those in Example 1.

In Example 2, as the solid electrolyte, $Li_{1.3}Al_{0.3}Ti_{1.7}(PO_4)_3$ was used.

In Example 3, as the solid electrolyte, $Li_{1.5}Al_{0.5}Ge_{1.5}(PO_4)_3$ was used.

In Example 4, as the solid electrolyte, $Li_{1.55}Al_{0.2}Zr_{1.7}Si_{0.25}P_{9.75}O_{12}$ was used.

In Example 5, as the solid electrolyte, $Li_{1.4}Na_{0.1}Zr_{1.5}Al_{0.5}(PO_4)_3$ was used.

In Example 6, as the solid electrolyte, $Li_{1.4}Ca_{0.25}Er_{0.3}Zr_{1.7}(PO_4)_{3.2}$ was used.

In Example 7, as the solid electrolyte, $Li_{1.4}Ca_{0.25}Yb_{0.3}Zr_{1.7}(PO_4)_{3.2}$ was used.

In Example 8, as the solid electrolyte, $70Li_2S\text{-}30P_2S_5$ was used.

The crystal structures of Examples 2 to 7 were rhombohedral crystals. In Example 8, the diffraction peak obtained by X-ray diffraction was broad and a glass structure was obtained.

Comparative Examples 2 to 8

Comparative Examples 2 to 8 are different from Examples 2 to 8, in that MZP was not added to the solid electrolyte layer. The ionic conductivity was obtained by setting other conditions to be similar to those in Examples 2 to 8.

Comparing Examples 2 to 8 with Comparative Examples 2 to 8, the ionic conductivity was improved by adding MZP to the solid electrolyte layer in all cases. The results of Examples 1 to 8 and Comparative Examples 1 to 8 are summarized in Table 1.

TABLE 1

| | Solid Electrolyte | | | MZP | | | | Ionic |
| | Material Name | Crystal Phase | Abundance Ratio (volume %) | Material Name | Crystal Phase | Abundance Ratio (volume %) | Average Particle Size (µm) | P2/P1 | Conductivity (S/cm) |
|---|---|---|---|---|---|---|---|---|---|
| Example 1 | $LiZr_2(PO_4)_3$ | Rhombohedral | 50 | $Ca_{0.5}Zr_2(PO_4)_3$ | Rhombohedral | 50 | 1.2 | 0.88 | $8.10 \times 10^{-6}$ |
| Example 2 | $Li_{1.3}Al_{0.3}Ti_{1.7}(PO_4)_3$ | Rhombohedral | 50 | $Ca_{0.5}Zr_2(PO_4)_3$ | Rhombohedral | 50 | 1.2 | 0.88 | $8.20 \times 10^{-4}$ |
| Example 3 | $Li_{1.5}Al_{0.5}Ge_{1.5}(PO_4)_3$ | Rhombohedral | 50 | $Ca_{0.5}Zr_2(PO_4)_3$ | Rhombohedral | 50 | 1.2 | 0.88 | $5.20 \times 10^{-4}$ |
| Example 4 | $Li_{1.55}Al_{0.2}Zr_{1.7}Si_{0.25}P_{9.75}O_{12}$ | Rhombohedral | 50 | $Ca_{0.5}Zr_2(PO_4)_3$ | Rhombohedral | 50 | 1.2 | 0.88 | $2.10 \times 10^{-6}$ |
| Example 5 | $Li_{1.4}Na_{0.1}Zr_{1.5}Al_{0.5}(PO_4)_3$ | Rhombohedral | 50 | $Ca_{0.5}Zr_2(PO_4)_3$ | Rhombohedral | 50 | 1.2 | 0.88 | $5.10 \times 10^{-6}$ |
| Example 6 | $Li_{1.4}Ca_{0.25}Er_{0.3}Zr_{1.7}(PO_4)_{3.2}$ | Rhombohedral | 50 | $Ca_{0.5}Zr_2(PO_4)_3$ | Rhombohedral | 50 | 1.2 | 0.88 | $3.60 \times 10^{-6}$ |
| Example 7 | $Li_{1.4}Ca_{0.25}Yb_{0.3}Zr_{1.7}(PO_4)_{3.2}$ | Rhombohedral | 50 | $Ca_{0.5}Zr_2(PO_4)_3$ | Rhombohedral | 50 | 1.2 | 0.88 | $3.90 \times 10^{-6}$ |
| Example 8 | $70Li_2S\text{—}30P_2S_5$ | Glass | 50 | $Ca_{0.5}Zr_2(PO_4)_3$ | Rhombohedral | 50 | 1.2 | 0.88 | $1.50 \times 10^{-4}$ |
| Comparative Example 1 | $LiZr_2(PO_4)_2$ | Rhombohedral | 100 | None | — | — | — | 0.88 | $1.02 \times 10^{-7}$ |
| Comparative Example 2 | $Li_{1.3}Al_{0.3}Ti_{1.7}(PO_4)_3$ | Rhombohedral | 100 | None | — | — | — | 0.88 | $6.20 \times 10^{-4}$ |
| Comparative Example 3 | $L_{1.5}Al_{0.5}Ge_{1.5}(PO_4)_3$ | Rhombohedral | 100 | None | — | — | — | 0.88 | $3.50 \times 10^{-4}$ |
| Comparative Example 4 | $Li_{1.55}Al_{0.2}Zr_{1.7}Si_{0.25}P_{9.75}O_{12}$ | Rhombohedral | 100 | None | — | — | — | 0.88 | $1.00 \times 10^{-6}$ |
| Comparative Example 5 | $Li_{1.4}Na_{0.1}Zr_{1.5}Al_{0.5}(PO_4)_3$ | Rhombohedral | 100 | None | — | — | — | 0.88 | $3.50 \times 10^{-6}$ |
| Comparative Example 6 | $Li_{1.4}Ca_{0.25}Er_{0.3}Zr_{1.7}(PO_4)_{3.2}$ | Rhombohedral | 100 | None | — | — | — | 0.88 | $2.40 \times 10^{-6}$ |
| Comparative Example 7 | $Li_{1.4}Ca_{0.25}Yb_{0.3}Zr_{1.7}(PO_4)_{3.2}$ | Rhombohedral | 100 | None | — | — | — | 0.88 | $2.60 \times 10^{-6}$ |
| Comparative Example 8 | $70Li_2S\text{—}30P_2S_5$ | Glass | 100 | None | — | — | — | — | $1.90 \times 10^{-5}$ |

Examples 9 to 20

Examples 9 to 20 are different from Example 1 in that the material of MZP forming the solid electrolyte layer was changed. Other conditions were set to be similar to those in Example 1. MZP in Example 15 was produced by synthesizing $CuZr_2(PO_4)_3$ of Example 11 and then performing an oxidation treatment. The oxidation treatment was performed, for example, by heating under a temperature condition of 300° C. or higher and 600° C. or lower.

In Example 9, as MZP, $NaZr_2(PO_4)_3$ was used.
In Example 10, as MZP, $KZr_2(PO_4)_3$ was used.
In Example 11, as MZP, $CuZr_2(PO_4)_3$ was used.
In Example 12, as MZP, $Mg_{0.5}Zr_2(PO_4)_3$ was used.
In Example 13, as MZP, $Sr_{0.5}Zr_2(PO_4)_3$ was used.
In Example 14, as MZP, $Ba_{0.5}Zr_2(PO_4)_3$ was used.
In Example 15, as MZP, $Cu_{0.5}Zr_2(PO_4)_3$ was used.
In Example 16, as MZP, $Ni_{0.5}Zr_2(PO_4)_3$ was used.
In Example 17, as MZP, $Zn_{0.5}Zr_2(PO_4)_3$ was used.
In Example 18, as MZP, $Ca_{0.38}Sr_{0.12}Zr_2(PO_4)_3$ was used.
In Example 19, as MZP, $Ca_{0.25}Sr_{0.25}Zr_2(PO_4)_3$ was used.
In Example 20, as MZP, $Ca_{0.20}Sr_{0.30}Zr_2(PO_4)_3$ was used.

The results of Examples 9 to 20 are summarized in Table 2. Table 2 shows the results of Example 1 and Comparative Example 1 for comparison. In all of Examples 9 to 20, the ionic conductivity was improved as compared with Comparative Example 1.

In Example 21, the abundance ratio of MZP was set to 1 volume %.

In Example 22, the abundance ratio of MZP was set to 10 volume %.

In Example 23, the abundance ratio of MZP was set to 20 volume %.

In Example 24, the abundance ratio of MZP was set to 25 volume %.

In Example 25, the abundance ratio of MZP was set to 30 volume %.

In Example 26, the abundance ratio of MZP was set to 40 volume %.

In Example 27, the abundance ratio of MZP was set to 70 volume %.

In Example 28, the abundance ratio of MZP was set to 75 volume %.

In Example 29, the abundance ratio of MZP was set to 80 volume %.

In Example 30, the abundance ratio of MZP was set to 90 volume %.

In Example 31, the abundance ratio of MZP was set to 96 volume %.

TABLE 2

| | Solid Electrolyte | | | MZP | | | | | Ionic |
| --- | --- | --- | --- | --- | --- | --- | --- | --- | --- |
| | Material Name | Crystal Phase | Abundance Ratio (volume %) | Material Name | Crystal Phase | Abundance Ratio (volume %) | Average Particle Size (μm) | P2/P1 | Conductivity (S/cm) |
| Example 1 | $LiZr_2(PO_4)_3$ | Rhombohedral | 50 | $Ca_{0.5}Zr_2(PO_4)_3$ | Rhombohedral | 50 | 1.2 | 0.88 | $8.10 \times 10^{-6}$ |
| Example 9 | $LiZr_2(PO_4)_3$ | Rhombohedral | 50 | $NaZr_2(PO_4)_3$ | Rhombohedral | 50 | 1.2 | 0.88 | $5.10 \times 10^{-6}$ |
| Example 10 | $LiZr_2(PO_4)_3$ | Rhombohedral | 50 | $KZr_2(PO_4)_3$ | Rhombohedral | 50 | 1.2 | 0.88 | $4.70 \times 10^{-6}$ |
| Example 11 | $LiZr_2(PO_4)_3$ | Rhombohedral | 50 | $CuZr_2(PO_4)_3$ | Rhombohedral | 50 | 1.2 | 0.88 | $3.10 \times 10^{-6}$ |
| Example 12 | $LiZr_2(PO_4)_3$ | Rhombohedral | 50 | $Mg_{0.5}Zr_2(PO_4)_3$ | Monoclinic | 50 | 1.2 | 0.88 | $2.10 \times 10^{-7}$ |
| Example 13 | $LiZr_2(PO_4)_3$ | Rhombohedral | 50 | $Sr_{0.5}Zr_2(PO_4)_3$ | Rhombohedral | 50 | 1.2 | 0.88 | $7.50 \times 10^{-6}$ |
| Example 14 | $LiZr_2(PO_4)_3$ | Rhombohedral | 50 | $Ba_{0.5}Zr_2(PO_4)_3$ | Rhombohedral | 50 | 1.2 | 0.88 | $4.30 \times 10^{-6}$ |
| Example 15 | $LiZr_2(PO_4)_3$ | Rhombohedral | 50 | $Cu_{0.5}Zr_2(PO_4)_3$ | Rhombohedral | 50 | 1.2 | 0.88 | $2.30 \times 10^{-7}$ |
| Example 16 | $LiZr_2(PO_4)_3$ | Rhombohedral | 50 | $Ni_{0.5}Zr_2(PO_4)_3$ | Rhombohedral | 50 | 1.2 | 0.88 | $2.60 \times 10^{-7}$ |
| Example 17 | $LiZr_2(PO_4)_3$ | Rhombohedral | 50 | $Zn_{0.5}Zr_2(PO_4)_3$ | Monoclinic | 50 | 1.2 | 0.88 | $1.50 \times 10^{-7}$ |
| Example 18 | $LiZr_2(PO_4)_3$ | Rhombohedral | 50 | $Ca_{0.38}Sr_{0.12}Zr_2(PO_4)_3$ | Rhombohedral | 50 | 1.2 | 0.88 | $4.30 \times 10^{-6}$ |
| Example 19 | $LiZr_2(PO_4)_3$ | Rhombohedral | 50 | $Ca_{0.25}Sr_{0.25}Zr_2(PO_4)_3$ | Rhombohedral | 50 | 1.2 | 0.88 | $6.40 \times 10^{-6}$ |
| Example 20 | $LiZr_2(PO_4)_3$ | Rhombohedral | 50 | $Ca_{0.20}Sr_{0.30}Zr_2(PO_4)_3$ | Rhombohedral | 50 | 1.2 | 0.88 | $6.10 \times 10^{-6}$ |
| Comparative Example 1 | $LiZr_2(PO_4)_3$ | Rhombohedral | 100 | None | — | — | — | 0.88 | $1.02 \times 10^{-7}$ |

Examples 21 to 31, Comparative Example 9

Examples 21 to 31 and Comparative Example 9 are different from Example 1 in that the volume ratio between the solid electrolyte and MZP in the solid electrolyte layer was changed. Other conditions were set to be similar to those in Example 1.

In Comparative Example 9, the abundance ratio of MZP was set to 100 volume %.

The results of Examples 21 to 30 and Comparative Example 9 are summarized in Table 3. Table 3 shows the results of Example 1 and Comparative Example 1 for comparison. The ionic conductivity changed depending on the abundance ratio of the solid electrolyte and MZP.

TABLE 3

| | Solid Electrolyte | | | MZP | | | Average Particle Size (μm) | P2/P1 | Ionic Conductivity (S/cm) |
| | Material Name | Crystal Phase | Abundance Ratio (volume %) | Material Name | Crystal Phase | Abundance Ratio (volume %) | | | |
|---|---|---|---|---|---|---|---|---|---|
| Comparative Example 1 | $LiZr_2(PO_4)_3$ | Rhombohedral | 100 | — | — | 0 | 1.2 | 0.88 | $1.02 \times 10^{-7}$ |
| Example 21 | $LiZr_2(PO_4)_3$ | Rhombohedral | 99 | $Ca_{0.5}Zr_2(PO_4)_3$ | Rhombohedral | 1 | 1.2 | 0.88 | $4.30 \times 10^{-7}$ |
| Example 22 | $LiZr_2(PO_4)_3$ | Rhombohedral | 90 | $Ca_{0.5}Zr_2(PO_4)_3$ | Rhombohedral | 10 | 1.2 | 0.88 | $4.70 \times 10^{-7}$ |
| Example 23 | $LiZr_2(PO_4)_3$ | Rhombohedral | 80 | $Ca_{0.5}Zr_2(PO_4)_3$ | Rhombohedral | 20 | 1.2 | 0.88 | $6.30 \times 10^{-7}$ |
| Example 24 | $LiZr_2(PO_4)_3$ | Rhombohedral | 75 | $Ca_{0.5}Zr_2(PO_4)_3$ | Rhombohedral | 25 | 1.2 | 0.88 | $9.20 \times 10^{-7}$ |
| Example 25 | $LiZr_2(PO_4)_3$ | Rhombohedral | 70 | $Ca_{0.5}Zr_2(PO_4)_3$ | Rhombohedral | 30 | 1.2 | 0.88 | $1.20 \times 10^{-6}$ |
| Example 26 | $LiZr_2(PO_4)_3$ | Rhombohedral | 60 | $Ca_{0.5}Zr_2(PO_4)_3$ | Rhombohedral | 40 | 1.2 | 0.88 | $6.20 \times 10^{-6}$ |
| Example 1 | $LiZr_2(PO_4)_3$ | Rhombohedral | 50 | $Ca_{0.5}Zr_2(PO_4)_3$ | Rhombohedral | 50 | 1.2 | 0.88 | $8.10 \times 10^{-6}$ |
| Example 27 | $LiZr_2(PO_4)_3$ | Rhombohedral | 30 | $Ca_{0.5}Zr_2(PO_4)_3$ | Rhombohedral | 70 | 1.2 | 0.88 | $6.30 \times 10^{-6}$ |
| Example 28 | $LiZr_2(PO_4)_3$ | Rhombohedral | 25 | $Ca_{0.5}Zr_2(PO_4)_3$ | Rhombohedral | 75 | 1.2 | 0.88 | $3.90 \times 10^{-6}$ |
| Example 29 | $LiZr_2(PO_4)_3$ | Rhombohedral | 20 | $Ca_{0.5}Zr_2(PO_4)_3$ | Rhombohedral | 80 | 1.2 | 0.88 | $3.30 \times 10^{-6}$ |
| Example 30 | $LiZr_2(PO_4)_3$ | Rhombohedral | 10 | $Ca_{0.5}Zr_2(PO_4)_3$ | Rhombohedral | 90 | 1.2 | 0.88 | $3.10 \times 10^{-6}$ |
| Example 31 | $LiZr_2(PO_4)_3$ | Rhombohedral | 4 | $Ca_{0.5}Zr_2(PO_4)_3$ | Rhombohedral | 96 | 1.2 | 0.88 | $1.20 \times 10^{-6}$ |
| Comparative Example 9 | — | — | 0 | $Ca_{0.5}Zr_2(PO_4)_3$ | Rhombohedral | 100 | 1.2 | 0.88 | $1.00 \times 10^{-7}$ |

Examples 32 to 37

Examples 32 to 37 are different from Example 1 in that the particle size of MZP in the solid electrolyte layer was changed. Other conditions were set to be similar to those in Example 1. The particle size of MZP was adjusted by sieving using meshes having different sizes of openings.

In Example 32, the particle size of MZP was set to 0.20 μm.

In Example 33, the particle size of MZP was set to 0.34 μm.

In Example 34, the particle size of MZP was set to 0.50 μm.

In Example 35, the particle size of MZP was set to 3.20 μm.

In Example 36, the particle size of MZP was set to 5.00 μm.

In Example 37, the particle size of MZP was set to 6.20 μm.

The results of Examples 32 to 37 are summarized in Table 4. Table 4 shows the results of Example 1 for comparison. The ionic conductivity changed depending on the particle size of MZP.

TABLE 4

| | Solid Electrolyte | | | MZP | | | Average Particle Size (μm) | P2/P1 | Ionic Conductivity (S/cm) |
| | Material Name | Crystal Phase | Abundance Ratio (volume %) | Material Name | Crystal Phase | Abundance Ratio (volume %) | | | |
|---|---|---|---|---|---|---|---|---|---|
| Example 32 | $LiZr_2(PO_4)_3$ | Rhombohedral | 50 | $Ca_{0.5}Zr_2(PO_4)_3$ | Rhombohedral | 50 | 0.20 | 0.88 | $2.30 \times 10^{-6}$ |
| Example 33 | $LiZr_2(PO_4)_3$ | Rhombohedral | 50 | $Ca_{0.5}Zr_2(PO_4)_3$ | Rhombohedral | 50 | 0.34 | 0.88 | $3.20 \times 10^{-6}$ |
| Example 34 | $LiZr_2(PO_4)_3$ | Rhombohedral | 50 | $Ca_{0.5}Zr_2(PO_4)_3$ | Rhombohedral | 50 | 0.50 | 0.88 | $4.80 \times 10^{-6}$ |
| Example 1 | $LiZr_2(PO_4)_3$ | Rhombohedral | 50 | $Ca_{0.5}Zr_2(PO_4)_3$ | Rhombohedral | 50 | 1.20 | 0.88 | $8.10 \times 10^{-6}$ |
| Example 35 | $LiZr_2(PO_4)_3$ | Rhombohedral | 50 | $Ca_{0.5}Zr_2(PO_4)_3$ | Rhombohedral | 50 | 3.20 | 0.88 | $3.20 \times 10^{-6}$ |
| Example 36 | $LiZr_2(PO_4)_3$ | Rhombohedral | 50 | $Ca_{0.5}Zr_2(PO_4)_3$ | Rhombohedral | 50 | 5.00 | 0.88 | $2.10 \times 10^{-6}$ |
| Example 37 | $LiZr_2(PO_4)_3$ | Rhombohedral | 50 | $Ca_{0.5}Zr_2(PO_4)_3$ | Rhombohedral | 50 | 6.20 | 0.88 | $2.02 \times 10^{-7}$ |

Examples 38 to 41, Comparative Examples 10 and 11

Examples 38 to 41 are different from Example 1 in that the crystal structures of the solid electrolyte and MZP were changed. Other conditions were set to be similar to those in Example 1. Comparative Examples 10 and 11 are different from Comparative Example 1 in that the crystal structure of the solid electrolyte was changed. Other conditions were set to be similar to those in Comparative Example 1.

Since $LiZr_2(PO_4)_3$ may select a plurality of crystal structures, the crystal structure was changed by changing the manufacturing conditions. The triclinic $LiZr_2(PO_4)_3$ was produced by using a flux method, and was obtained by setting the melting temperature to 1200° C., and slowly cooling. The monoclinic solid electrolyte was produced by using the flux method, and was obtained by setting the melting temperature to 900° C., and slowly cooling. In principle, regarding MZP, just one crystal structure corresponding to the composition was selected, so the crystal structure was changed by changing the material type.

In Example 38, the crystal phase of the solid electrolyte was set to triclinic, and $Ca_{0.5}Zr_2(PO_4)_3$ (the crystal phase was rhombohedral) was set as MZP.

In Example 39, the crystal phase of the solid electrolyte was set to monoclinic, and $Ca_{0.5}Zr_2(PO_4)_3$ (the crystal phase was rhombohedral) was set as MZP.

In Example 40, the crystal phase of the solid electrolyte was set to monoclinic, and $Mg_{0.5}Zr_2(PO_4)_3$ (the crystal phase was monoclinic) was set as MZP.

In Example 41, the crystal phase of the solid electrolyte was set to monoclinic, and $Zn_{0.5}Zr_2(PO_4)_3$ (the crystal phase was monoclinic) was set as MZP.

In Comparative Example 10, the crystal phase of the solid electrolyte was set to monoclinic.

In Comparative Example 11, the crystal phase of the solid electrolyte was set to triclinic.

The results of Examples 38 to 41 are summarized in Table 5. Table 5 shows the results of Example 1, Example 12, Example 17, and Comparative Example 1 for comparison. The rhombic crystal easily secures the path for conducting ions three-dimensionally. When the crystal phase of the solid electrolyte or MZP was rhombohedral, the ionic conductivity was higher than that in a case where the crystal phase was monoclinic or triclinic. Even when the solid electrolyte was monoclinic or triclinic, the ionic conductivity was improved by adding MZP to the solid electrolyte layer.

TABLE 5

| | Solid Electrolyte | | | MZP | | | Average Particle Size (μm) | P2/P1 | Ionic Conductivity (S/cm) |
|---|---|---|---|---|---|---|---|---|---|
| | Material Name | Crystal Phase | Abundance Ratio (volume %) | Material Name | Crystal Phase | Abundance Ratio (volume %) | | | |
| Example 1 | $LiZr_2(PO_4)_3$ | Rhombohedral | 50 | $Ca_{0.5}Zr_2(PO_4)_3$ | Rhombohedral | 50 | 1.2 | 0.88 | $8.10 \times 10^{-6}$ |
| Example 12 | $LiZr_2(PO_4)_3$ | Rhombohedral | 50 | $Mg_{0.5}Zr_2(PO_4)_3$ | Monoclinic | 50 | 1.2 | 0.88 | $2.10 \times 10^{-7}$ |
| Example 17 | $LiZr_2(PO_4)_3$ | Rhombohedral | 50 | $Zn_{0.5}Zr_2(PO_4)_3$ | Monoclinic | 50 | 1.2 | 0.88 | $1.50 \times 10^{-7}$ |
| Example 38 | $LiZr_2(PO_4)_3$ | Triclinic | 50 | $Ca_{0.5}Zr_2(PO_4)_3$ | Rhombohedral | 50 | 1.2 | 0.88 | $2.30 \times 10^{-7}$ |
| Example 39 | $LiZr_2(PO_4)_3$ | Monoclinic | 50 | $Ca_{0.5}Zr_2(PO_4)_3$ | Rhombohedral | 50 | 1.2 | 0.88 | $1.01 \times 10^{-7}$ |
| Example 40 | $LiZr_2(PO_4)_3$ | Monoclinic | 50 | $Mg_{0.5}Zr_2(PO_4)_3$ | Monoclinic | 50 | 1.2 | 0.88 | $9.20 \times 10^{-8}$ |
| Example 41 | $LiZr_2(PO_4)_3$ | Monoclinic | 50 | $Zn_{0.5}Zr_2(PO_4)_3$ | Monoclinic | 50 | 1.2 | 0.88 | $9.50 \times 10^{-8}$ |
| Comparative Example 10 | $LiZr_2(PO_4)_3$ | Monoclinic | 100 | — | — | 0 | 1.2 | 0.88 | $8.10 \times 10^{-8}$ |
| Comparative Example 11 | $LiZr_2(PO_4)_3$ | triclinic | 100 | — | — | 0 | 1.2 | 0.88 | $9.10 \times 10^{-8}$ |
| Comparative Example 1 | $LiZr_2(PO_4)_3$ | Rhombohedral | 100 | — | — | 0 | 1.2 | 0.88 | $1.02 \times 10^{-7}$ |

Examples 42 to 49

Examples 42 to 49 are different from Example 1 in that the relationship of the peak intensity ratio in the X-ray diffraction of MZP was changed. Other conditions were set to be similar to those in Example 1. The peak intensity ratio of MZP in X-ray diffraction was adjusted by changing the heating conditions during firing of MZP. Specific examples of the heating conditions include a heating temperature, a heating time, a temperature rising time, a temperature lowering time, and the presence or absence of weighting. The heating temperature refers to the time for heating the temperature condition to a constant temperature. The heating time refers to the time for heating at a constant temperature. The temperature rising time refers to the time from the start of heating to the heating temperature. The temperature lowering time refers to the cooling time from the heating temperature to room temperature. The higher the heating temperature, the smaller the peak intensity. The peak intensity ratio increases when the temperature rising time is short. The peak intensity ratio decreases when the temperature lowering time is short. When fired with a weight applied, the peak intensity ratio is greater than that in a case where the weight is not applied.

In Example 42, the peak intensity ratio between the first peak and the second peak was set to 0.43.

In Example 43, the peak intensity ratio between the first peak and the second peak was set to 0.46.

In Example 44, the peak intensity ratio between the first peak and the second peak was set to 0.53.

In Example 45, the peak intensity ratio between the first peak and the second peak was set to 0.64.

In Example 46, the peak intensity ratio between the first peak and the second peak was set to 1.20.

In Example 47, the peak intensity ratio between the first peak and the second peak was 1.40.

In Example 48, the peak intensity ratio between the first peak and the second peak was set to 2.10.

In Example 49, the peak intensity ratio between the first peak and the second peak was set to 2.40.

TABLE 6

|  | Solid Electrolyte | | | MZP | | | | |
|---|---|---|---|---|---|---|---|---|
|  | Material Name | Crystal Phase | Abundance Ratio (volume) | Material Name | Crystal Phase | Abundance Ratio (volume) | Average Particle Size (μm) | P2/P1 | Ionic Conductivity (S/cm) |
| Example 42 | $LiZr_2(PO_4)_3$ | Rhombohedral | 50 | $Ca_{0.5}Zr_2(PO_4)_3$ | Rhombohedral | 50 | 1.2 | 0.43 | $1.30 \times 10^{-7}$ |
| Example 43 | $LiZr_2(PO_4)_3$ | Rhombohedral | 50 | $Ca_{0.5}Zr_2(PO_4)_3$ | Rhombohedral | 50 | 1.2 | 0.46 | $1.50 \times 10^{-7}$ |
| Example 44 | $LiZr_2(PO_4)_3$ | Rhombohedral | 50 | $Ca_{0.5}Zr_2(PO_4)_3$ | Rhombohedral | 50 | 1.2 | 0.53 | $2.10 \times 10^{-6}$ |
| Example 45 | $LiZr_2(PO_4)_3$ | Rhombohedral | 50 | $Ca_{0.5}Zr_2(PO_4)_3$ | Rhombohedral | 50 | 1.2 | 0.64 | $3.30 \times 10^{-6}$ |
| Example 1 | $LiZr_2(PO_4)_3$ | Rhombohedral | 50 | $Ca_{0.5}Zr_2(PO_4)_3$ | Rhombohedral | 50 | 1.2 | 0.88 | $8.10 \times 10^{-6}$ |
| Example 46 | $LiZr_2(PO_4)_3$ | Rhombohedral | 50 | $Ca_{0.5}Zr_2(PO_4)_3$ | Rhombohedral | 50 | 1.2 | 1.2 | $6.10 \times 10^{-6}$ |
| Example 47 | $LiZr_2(PO_4)_3$ | Rhombohedral | 50 | $Ca_{0.5}Zr_2(PO_4)_3$ | Rhombohedral | 50 | 1.2 | 1.4 | $5.30 \times 10^{-6}$ |
| Example 48 | $LiZr_2(PO_4)_3$ | Rhombohedral | 50 | $Ca_{0.5}Zr_2(PO_4)_3$ | Rhombohedral | 50 | 1.2 | 2.1 | $4.80 \times 10^{-6}$ |
| Example 49 | $LiZr_2(PO_4)_3$ | Rhombohedral | 50 | $Ca_{0.5}Zr_2(PO_4)_3$ | Rhombohedral | 50 | 1.2 | 2.4 | $3.10 \times 10^{-6}$ |

The results of Examples 42 to 49 are summarized in Table 6. Table 6 shows the results of Example 1 for comparison. The ionic conductivity changed by changing the value of P2/P1.

REFERENCE SIGNS LIST

1: Positive electrode layer
1A: Positive electrode current collector layer
1B: Positive electrode active material layer
2: Negative electrode layer
2A: Negative electrode current collector layer
2B: Negative electrode active material layer
3: Solid electrolyte layer
4 Laminated body
5: First external terminal
6: Second external terminal

What is claimed is:

1. A solid electrolyte layer, comprising:
a solid electrolyte; and
a compound represented by a composition formula $M_xZr_2(PO_4)_y$,
wherein, in the composition formula, M represents at least one selected from the group consisting of Na, K, Mg, Ca, Sr, Ba, Cu, Zn, and Ni, x satisfies 0<x≤2.5, y satisfies 2.7≤y≤3.5, and
the solid electrolyte and the compound are mixed in the solid electrolyte layer.

2. The solid electrolyte layer according to claim 1, wherein
an abundance ratio of the compound to the solid electrolyte is equal to or greater than 0.1 volume % and less than 100 volume %.

3. The solid electrolyte layer according to claim 1, wherein
an average particle size of the compound is 0.01 μm or more and 5 μm or less.

4. The solid electrolyte layer according to claim 1, wherein
a ratio of a portion having a rhombohedral crystal structure in the solid electrolyte is 50 volume % or more.

5. The solid electrolyte layer according to claim 1, wherein
the solid electrolyte and the compound have the same crystal structure.

6. The solid electrolyte layer according to claim 1, wherein
a crystal structure of the compound includes rhombohedral crystal.

7. The solid electrolyte layer according to claim 1, wherein
in a powder X-ray diffraction pattern obtained by X-ray diffraction measurement using a CuKα ray,
peak intensity P1 of a peak in a range of 19°≤2θ≤22° and peak intensity P2 of a peak in a range of 23°≤2θ≤26° satisfy a relationship of 0.5≤P2/P1≤3.0.

8. An all-solid-state secondary battery, comprising:
the solid electrolyte layer according to claim 1; and
a first electrode and a second electrode which sandwich the solid electrolyte layer.

9. A manufacturing method of a solid electrolyte layer, the method comprising:
a step of mixing a solid electrolyte and a compound represented by a composition formula $M_xZr_2(PO_4)_y$; and
a step of sintering a mixture obtained by the mixing, in a temperature range of 500° C. or higher and 1000° C. or lower,
wherein, in the composition formula, M represents at least one selected from the group consisting of Na, K, Mg, Ca, Sr, Ba, Cu, Zn, and Ni, x satisfies 0<x≤2.5, and y satisfies 2.7≤y≤3.5.

10. A manufacturing method of an all-solid-state battery including a solid electrolyte layer manufactured by the manufacturing method of a solid electrolyte layer according to claim 9, the method comprising:
a step of forming a first electrode at a position facing one surface of the solid electrolyte layer; and
a step of forming a second electrode at a position facing the other surface of the solid electrolyte layer.

* * * * *